(12) United States Patent
Andrews, Jr. et al.

(10) Patent No.: US 8,258,738 B2
(45) Date of Patent: Sep. 4, 2012

(54) LOW CURRENT ELECTRIC MOTOR STARTER

(75) Inventors: Robert J. Andrews, Jr., Attleboro, MA (US); Russell P. Brodeur, Franklin, MA (US); Kevin J. Dropps, Berkley, MA (US)

(73) Assignee: Sensata Technologies Massachusetts, Inc., Attleboro, MA (US)

( * ) Notice: Subject to any disclaimer, the term of this patent is extended or adjusted under 35 U.S.C. 154(b) by 401 days.

(21) Appl. No.: 12/611,198

(22) Filed: Nov. 3, 2009

(65) Prior Publication Data
US 2010/0134063 A1    Jun. 3, 2010

Related U.S. Application Data

(60) Provisional application No. 61/200,648, filed on Dec. 2, 2008.

(51) Int. Cl.
*H02P 1/44* (2006.01)

(52) U.S. Cl. .......... 318/786; 318/787; 318/788

(58) Field of Classification Search .......... 318/786, 318/787, 788, 791, 792
See application file for complete search history.

(56) References Cited

U.S. PATENT DOCUMENTS

| | | | |
|---|---|---|---|
| 3,600,656 A | 8/1971 | Gramkow | |
| 3,727,106 A * | 4/1973 | Mendel et al. | 361/48 |
| 3,905,748 A * | 9/1975 | Cairo et al. | 431/78 |
| 4,307,327 A | 12/1981 | Streater et al. | |
| 7,061,204 B2 | 6/2006 | Unno | |

* cited by examiner

*Primary Examiner* — Karen Masih
(74) *Attorney, Agent, or Firm* — Chapin IP Law, LLC

(57) ABSTRACT

A low cost motor starter is shown having a PTC resistor 12 serially connected to a triac 14 and a bias resistor in turn adapted to be connected to the start winding of a single phase motor. A reed relay 16 having a sense coil 16a serially connected to the main winding in one preferred embodiment and in parallel with the main and start windings in a second preferred embodiment, is magnetically coupled to reed contacts 16b, 16c. Reed contact 16b is connected to a location intermediate the PTC resistor 12 and the triac 14 while reed contact 16c is connected to the gate of the triac. A gate signal phase shifting network comprising capacitor C1-R2 is also connected to reed contact 16c and the gate.

7 Claims, 7 Drawing Sheets

LOW CURRENT ELECTRIC MOTOR STARTER

RELATED APPLICATIONS

This application claims priority based upon U.S. Provisional Application No. 61/200,648, filed Dec. 2, 2008.

FIELD OF THE INVENTION

The present invention relates generally to electric motor starters and more particularly to low power, positive temperature coefficient of resistivity (PTC) motor starters, particularly useful with refrigerator compressor motors.

BACKGROUND OF THE INVENTION

Single phase AC motors comprise a main winding and an auxiliary or start winding used for starting the motor. Various means have been employed to disconnect the start winding when the motor reaches a selected speed, such as centrifugal mechanisms, current relays and, more recently, solid state electronics circuits that respond to time or various motor operating parameters.

With respect to such means electro-mechanical devices have a disadvantage of being subject to wear over the years adversely affecting their reliability and solid state electronics circuits are relatively expensive and their dependability is open to question.

In U.S. Pat. No. 3,600,656, which issued in 1971, it is noted that it was known to connect a PTC resistor in series with the start winding, the PTC resistor being heated by the current that flows through the start winding causing the resistance of the PTC resistor to rise and reduce the current flowing through the start winding to a low level in a prescribed period of time. However, the continued current flow, though relatively of a low level, is inefficient and represents a loss of power. Further, the PTC resistor is continuously heated so that it presents a problem in cases where restarting of the motor is desired since the PTC resistor would still be in a blocking mode of operation.

U.S. Pat. No. 7,061,204 shows a PTC resistor serially connected to a start winding and to a triac for de-energizing the start winding. In this apparatus, the gate terminal of the triac is connected to a control circuit that includes a current detecting circuit. While the motor starter is effective to de-energize the PTC resistor and provides low power by essentially eliminating the start winding following start-up, this starter, which employs a current transformer, is relatively expensive.

It is also known to use a reed switch in the gate circuit of a triac that is serially connected to a start winding in order to effectively cut out the start winding following start-up. In U.S. Pat. No. 4,307,327, a triac is connected to a start winding and a reed switch is connected to the gate terminal of the triac. The reed switch has a sense coil that receives the combined start and main winding current of the motor. As the motor approaches synchronous speed with its concomitant lower main winding current the contacts of the reed switch open and turn off the triac thereby eliminating current flow through the start winding. However, this starter is designed to be used with capacitor start motors rather than with resistance start motors typically used for refrigerator compressors.

SUMMARY OF THE INVENTION

An object of the present invention is the provision of a low cost motor starter particularly useful for resistance start refrigeration compressor motors that eliminates start winding current as the motor approaches synchronous speed. Another object of the invention is the provision of a low cost motor starter that results in power savings by eliminating unnecessary start winding current upon starting of the motor.

Briefly stated, according to a preferred embodiment of the invention, a bi-directional thyristor, or triac, and a PTC resistor are connected in series relationship with each other and with the start winding of a single phase, resistance start AC motor. A current responsive reed switch has first and second contacts with the first contact connected to the gate of the triac and the second contact connected to a location intermediate to the PTC resistor and the second main terminal of the triac. The reed switch has a sense coil that, in one preferred embodiment of the invention, is serially connected to the main winding and is located in close magnetic coupling relationship with the reed switch. In a second preferred embodiment the coil is connected to both the main and the start windings. In both embodiments a capacitor is connected to the gate terminal of the triac to maintain current flow to the gate during zero-crossing intervals of the main winding current and a small bias resistor for generating an AC bias voltage, as discussed below, is connected to the first main terminal of the triac. Current limiting resistors are also connected to the gate of the triac and to the second contact of the reed switch. The resistor connected to the gate of the triac also functions, with the capacitor, as the phase shift network.

The initial current of the main winding during motor start up produces a sufficient magnetic field to close the reed switch and allow start winding current to flow. As the motor approaches synchronous speed the PTC resistor heats up and increases in resistance and that in turn reduces the start winding current. The main winding current reduces to its steady state, full speed level which is sufficiently low that the magnetic field produced in the sense coil becomes insufficient to actuate the reed switch which opens each zero crossing of the main winding current. Once the start winding current decreases below the triac's holding current it turns off and the start winding current is then fixed at zero.

Preferably, a current limiting resistor is connected to the reed switch contacts to limit in-rush current to the capacitor and to help reduce the reed switch and triac gate current. Another current limiting resistor preferably is connected to the gate of the triac to limit current particularly during zero crossing intervals of the main winding at which time the gate is fed by the capacitor. As noted above, the gate resistor, along with the capacitor, performs a phase shift function of the AC signal generated by resistor R3. The capacitor provides a phase shift of the gate signal and maintains a current flow to the triac during the start-up since during these in-phase intervals neither a sufficient start winding current nor a sufficient gate signal would be present for keeping the triac on and this would result in undesirable voltage spikes across the triac and reed switch and current spikes through the triac and reed switch.

BRIEF DESCRIPTION OF THE DRAWINGS

In the accompanying drawings, in which two of the various possible preferred embodiments of the invention are illustrated.

Corresponding reference characters indicate corresponding parts throughout the views of the drawings.

DETAILED DESCRIPTION OF THE PREFERRED EMBODIMENTS

Figure 1:
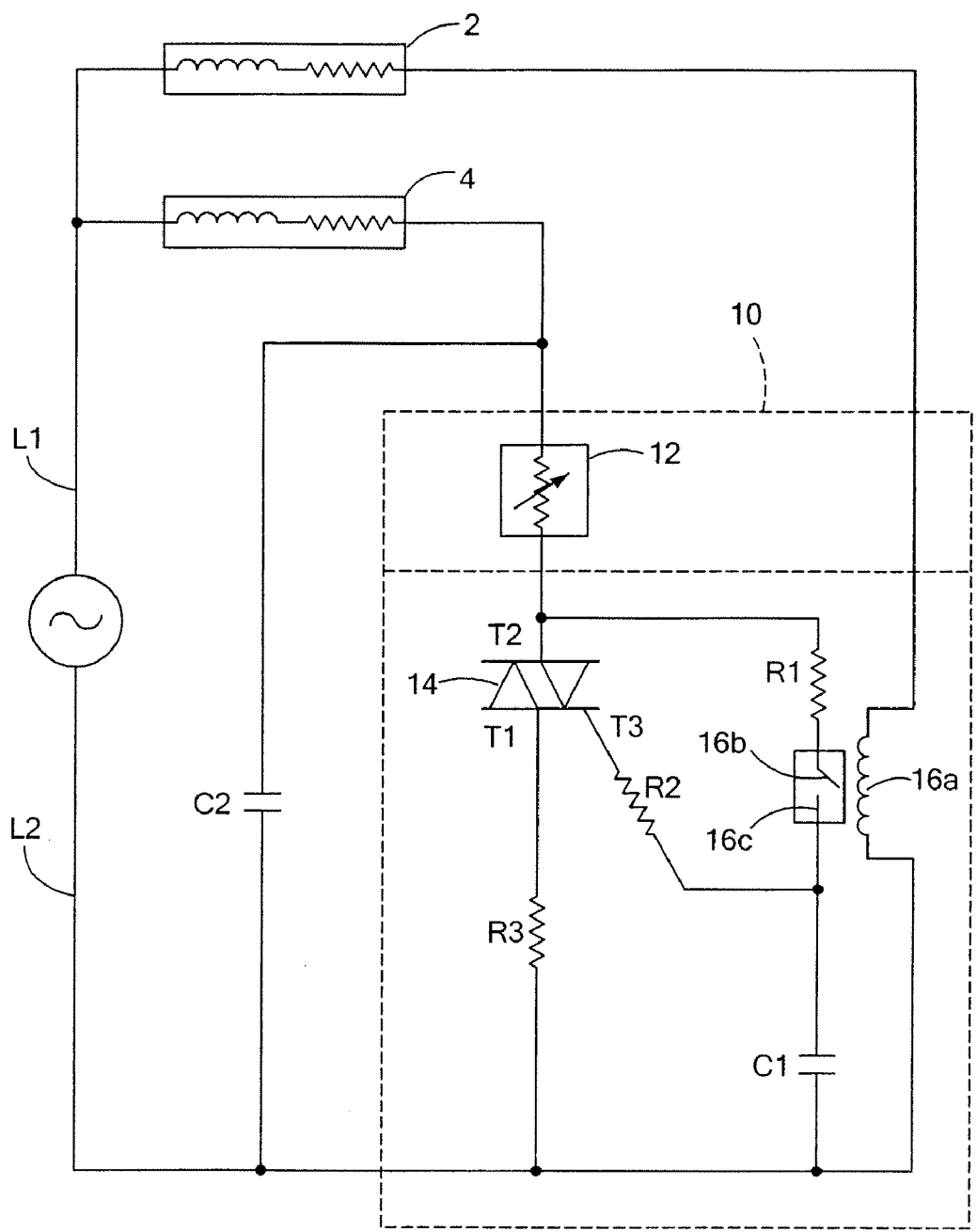
FIG. 1 is a schematic circuit diagram of a first preferred embodiment of the invention.

With reference to FIG. 1, a single phase resistance start AC motor, with which the motor starter made according to a first preferred embodiment of the invention can advantageously be used, comprises a main winding 2 connected in parallel with a start winding 4 and connected to a suitable alternating current power source through lines L1, L2. Start winding 4 is connected to power line L1 and in turn serially connected to a positive temperature coefficient (PTC) resistor 12 and a bi-directional thyristor or triac 14 having two main terminals T1, T2 and a gate T3. A reed switch 16 comprises a coil 16a serially connected to main winding 2 and line L2 and is disposed in close proximity in magnetic coupling to normally open reed switch contacts 16b, 16c that are movable into and out of engagement with each other. Reed switch contact 16b is connected to a location intermediate to PTC resistor 12 and triac 14. Reed switch contact 16c is connected to gate terminal T3 preferably through a reed switch resistor R2. Preferably, a capacitor C1 is connected to gate terminal T3 through resistor R2 and a resistor R3 is connected to main terminal T1. If desired, an optional run capacitor C2 can be connected across PTC resistor 12, triac 14 and resistor R3 on the return line L2 of the AC power source.

Resistor R3 in series with the triac main terminal T1 provides an AC bias voltage (generated from the start winding PTC current flowing through it) to capacitor C1 through gate resistor R2 which provides a charging current for the capacitor. It may be thought of as changing the voltage reference point for the triac gate (triac main terminal T1) at an AC potential above and below the neutral reference potential. Without this resistor R3, the capacitor voltage is much smaller and in phase with the triac forward voltage drop between the gate and terminal T1 so that the triac shuts off for a period of time at each zero crossing of the start winding PTC current due to insufficient gate current and voltage. With the resistor R3 in series with the T1 terminal, the AC bias voltage that is produced from the start winding PTC current flowing through it charges the capacitor through the triac gate resistor R2. A phase shift of the start winding PTC voltage signal occurs due to the R-C network of the gate resistor and capacitor. This out of phase voltage and increased level of voltage on the capacitor now provides an adequate gate voltage/current to the triac at the start winding PTC current zero crossing where the triac shuts off when the T2 current drops below the holding current minimum. This increased gate voltage/current now causes the triac to turn on immediately after it turns off, thereby preventing a delayed turn on of the triac.

The initial current in the main winding during motor start-up produces a sufficiently strong magnetic field in sense coil 16a to close reed switch contacts 16b, 16c which thereby allows the gate of triac 14 to have voltage and current sufficient to turn on triac 14 and allow start current to flow. Reed switch 16 opens when the main winding current drops below the drop-out current of the reed switch contacts; thus causing capacitor C1 to discharge through resistor R2, triac terminals T1 and T3, and resistor R3. This provides adequate gate current and voltage to cause the triac to turn on immediately after it turns off.

As the motor gets up to speed and the start winding current reduces due to self heating of PTC resistor 12 with its concomitant increase in resistance, the main winding current reduces to its steady state, full speed level becomes sufficiently low that the magnetic field produced in the sense coil 16a is too low to actuate the reed switch. As a result, triac 14 is no longer gated on after any drop in the start winding current below the triac holding current and the start winding current becomes fixed at zero.

Resistor R1 serves to limit in-rush current to capacitor C1 and also to help reduce the reed switch and triac gate current. Resistor R2 provides a phase shift function along with capacitor C1, as noted, as well as limits gate current, particularly during intervals where the reed switch is open at zero crossing of the main winding current. At this time the gate signal is fed by capacitor C1. Capacitor C1 phase shifts the gate signal and maintains current flow to the triac gate during the start-up phase. This is necessary due to the in-phase relationship that occurs between the start winding and the main winding current during start-up since during these in-phase intervals neither a sufficient start winding current nor a sufficient gate signal would be present for keeping the triac on. Repeated on and off switching of the triac without the phase shifted gate signal causes voltage and current spikes in and across the triac and reed switch, see FIG. 3, a trace of the voltage and current of a motor starter of the type shown in FIG. 1 but without capacitor C1 and resistor R3. Resistor R3 was found necessary for proper shifting of the gate signal and proper device operation, see FIG. 4, traces of the same motor starter but with capacitor C1 and FIG. 6, trace of the voltage and current with both capacitor C1 and resistor R3. Resistor R3 is formed by a heater wire, for example, one of nichrome.

A motor starter made according to the first preferred embodiment has the following components:
R1=680 ohms, ¼ watt
C1=47 microfarads, 6.3 volts (dipped radial ceramic)
R2=100 ohms, ¼ watt
R3=0.3 ohm, 15 watts (heater wire)
triac=MAC 228A8G (ON Semiconductor)
Reed switch=MLRR-4, 17-23 (Hamlin)

Figure 3:
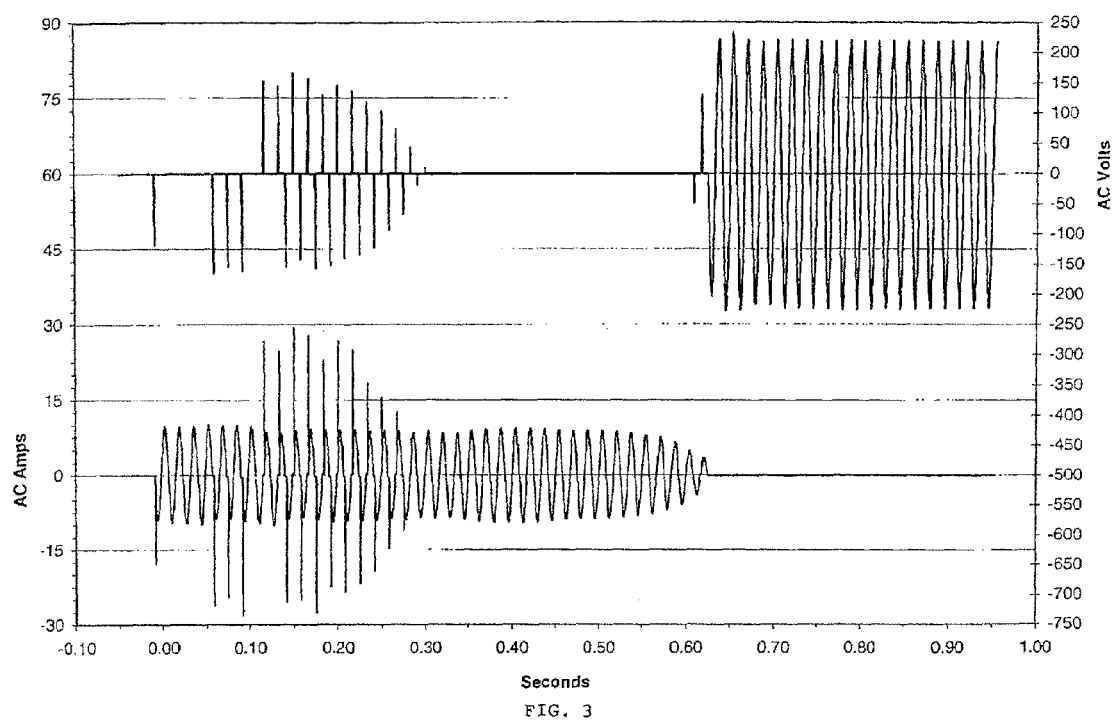
FIGS. 3-5 are current and voltage wave traces (sweeps=50000 points–20 usec/pt) for circuits similar to those of the preferred embodiments but missing certain components.
Figure 4:
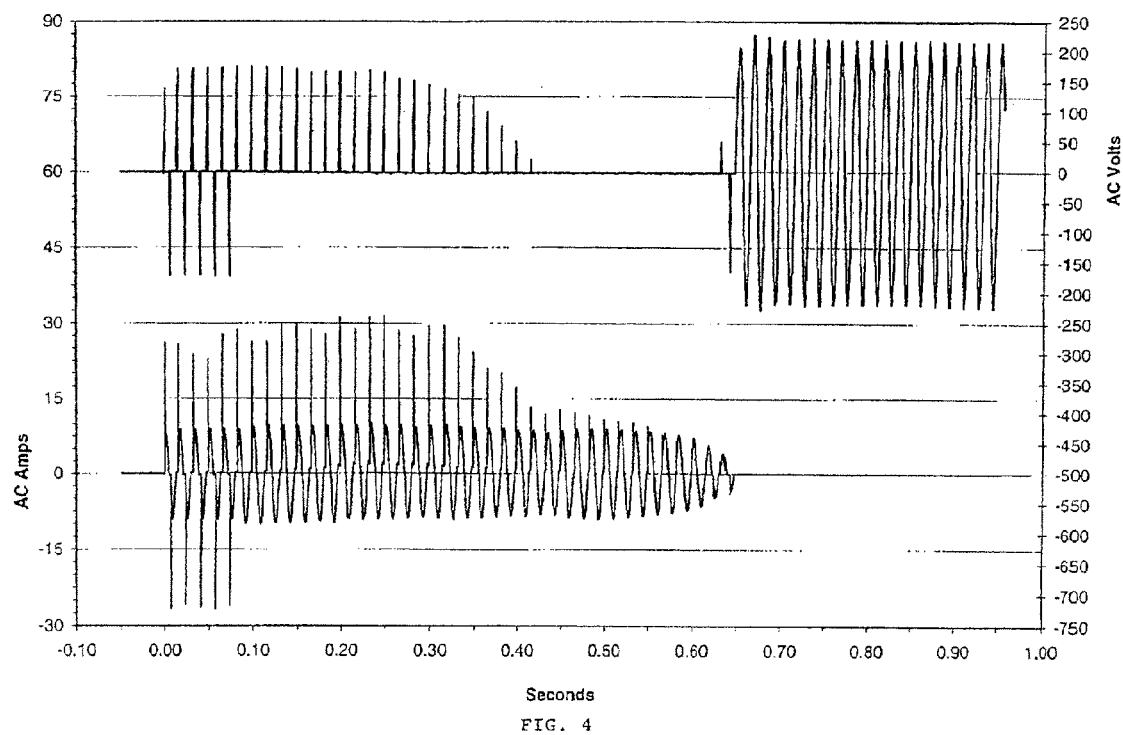
Figure 5:
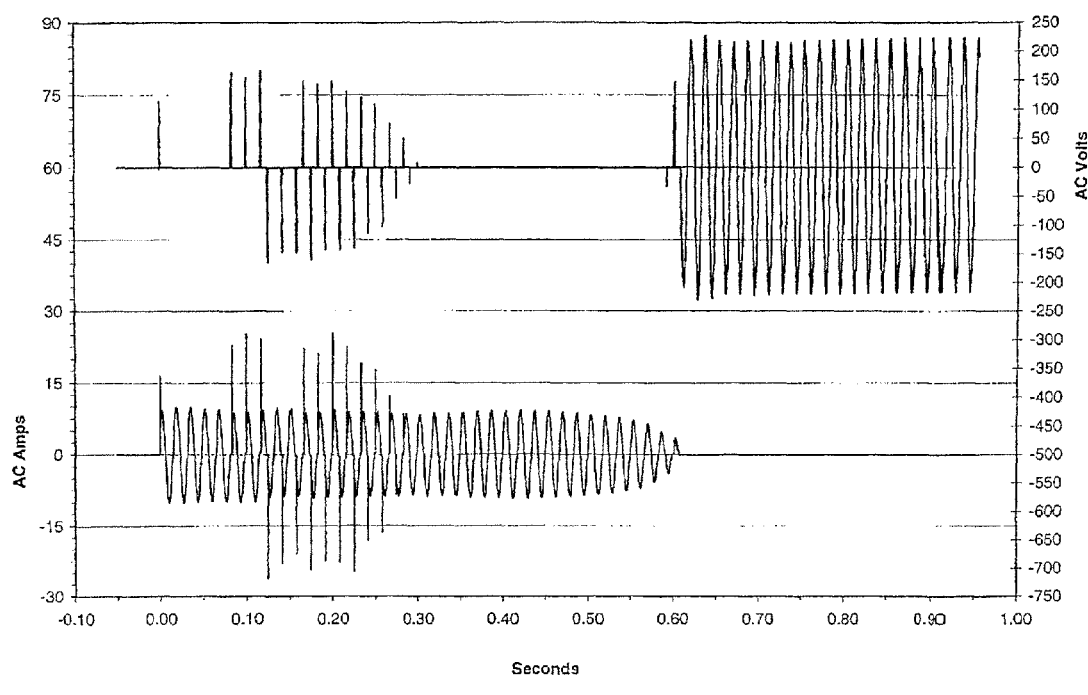
Figure 6:
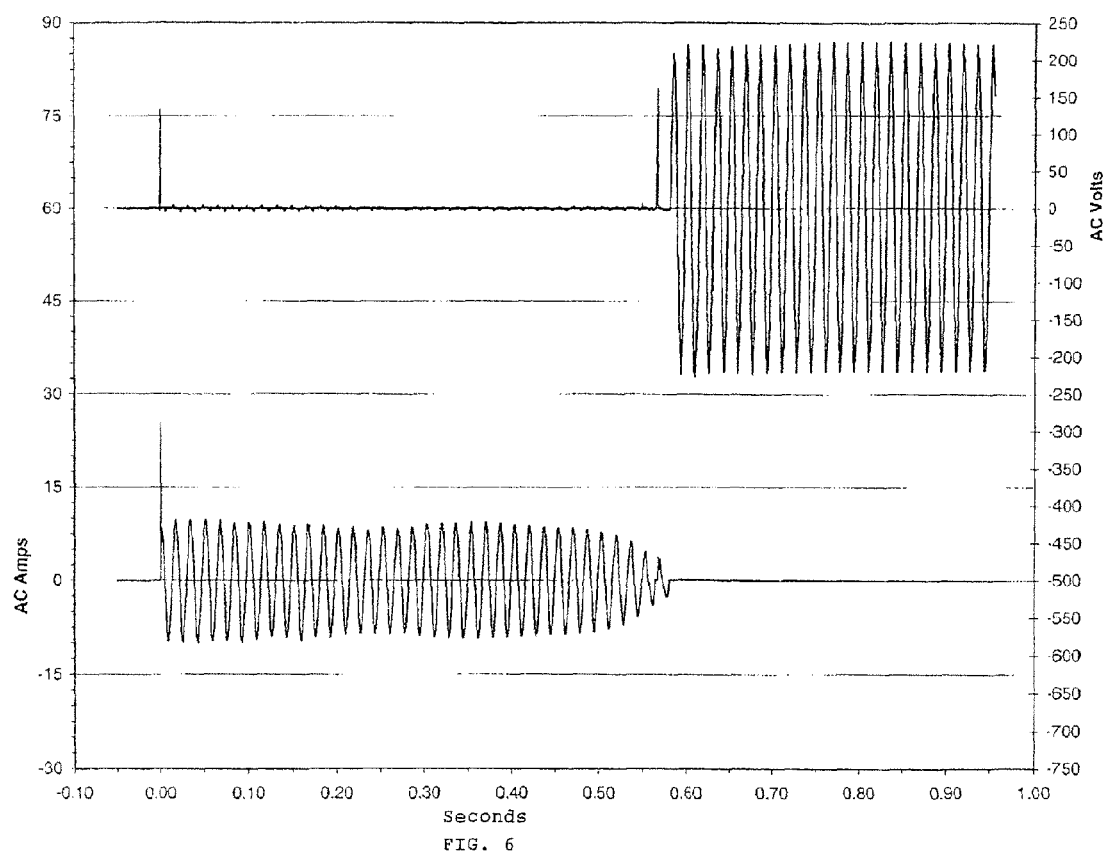
FIGS. 6 and 7 are traces similar to those of FIGS. 3-5 but show traces of the first and second preferred embodiments, respectively.

With respect to the traces of FIG. 3, an inspection reveals a rough start with many spikes in voltage and current. FIG. 4 shows similar traces for the same motor starter but with the addition of capacitor C1. Again, many voltage and current spikes are shown in the traces of FIG. 5 for the same motor starter as that used for FIG. 3 except in this starter capacitor C1 was not used but resistor R3 was included. Once again, there are many voltage and current spikes. FIG. 6 is a trace of voltage and current for a motor starter of the type shown in FIG. 1, that is, with both the capacitor C1 and resistor R3 included. In these traces essentially no voltage and current spikes are shown.

Figure 2:
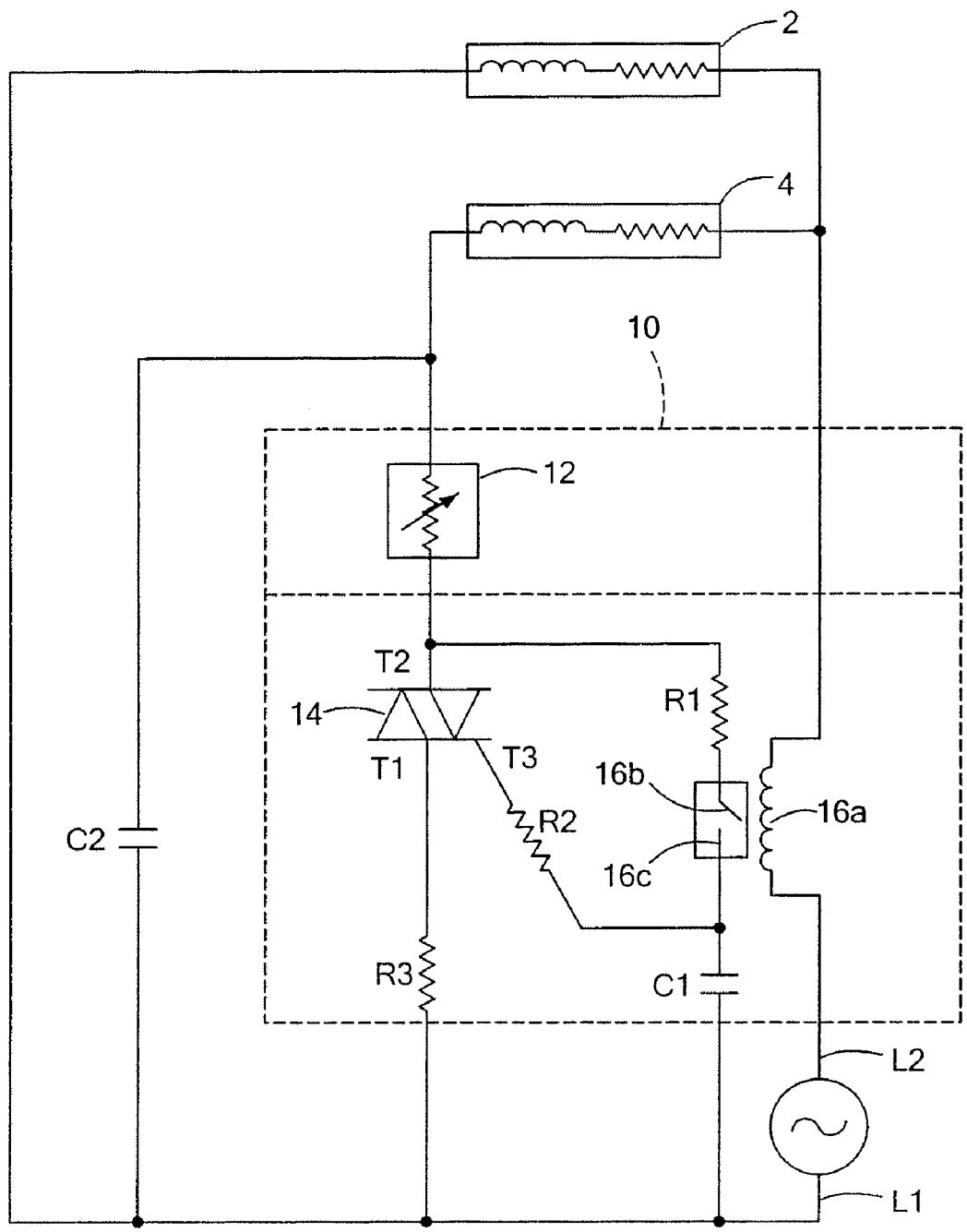
FIG. 2 is a schematic circuit diagram, similar to FIG. 1, showing a second preferred embodiment of the invention.
Figure 7:
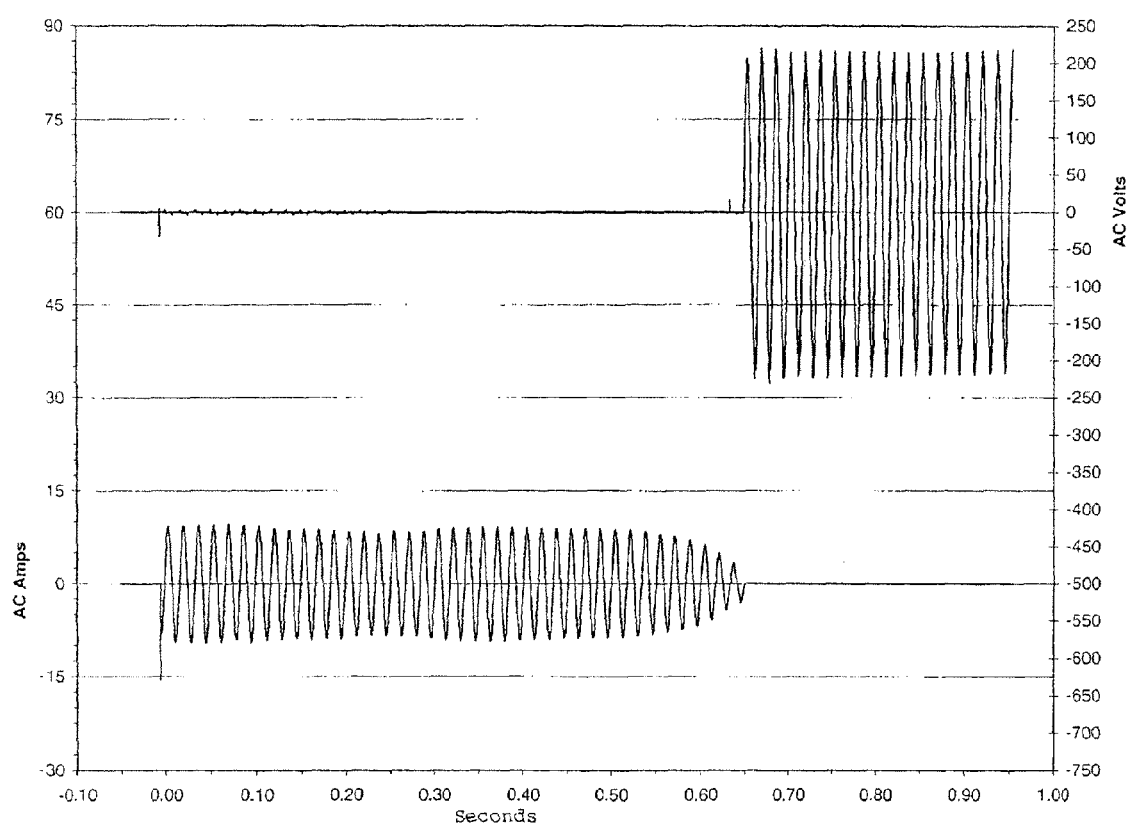

FIG. 2 shows a motor starter identical to that of FIG. 1 used in a motor start circuit in which the sense coil 16a receives the combined current of the main and start windings. Again in this case, the traces of FIG. 7 show essentially no spikes in either the voltage or current wave forms. Since the motor starter of FIG. 2 is the same as that of FIG. 1 except for the combined main and start winding current being fed to reed relay 16 reference may be had to the description of FIG. 1 above for a description of the FIG. 2 starter.

Although the invention has been described with regard to certain specific preferred embodiments thereof, variations and modifications will become apparent to those of ordinary skill in the art. For example, it is within the purview of the invention to put the reed switch coil in the neutral or return leg of the power source, if desired. It is therefore the intention that the appended claims be interpreted as broadly as possible in view of the prior art to include all such variations and modifications.

What is claimed:

1. Apparatus for controlling the start winding of an AC motor having a main winding and a start winding connected in parallel, power lines including a neutral connected to the windings and adapted to be connected to an AC power supply, comprising a triac having first and second main terminals and a gate terminal and a positive temperature coefficient (PTC) resistor connected in series with one main terminal and adapted for connection with the start winding, a current responsive reed switch having first and second terminals and a capacitor, one terminal of the reed switch being connected intermediate to the PTC resistor and the triac and the capacitor connected in series with the second terminal of the reed switch, the triac gate terminal connected to a location intermediate the reed switch and the capacitor and a bias resistor connected between the other triac main terminal and neutral and a sensing coil closely disposed to the reed switch and adapted for connection to the main winding.

2. Apparatus according to claim 1 in which the sense coil is adapted for serial connection with the main winding.

3. Apparatus according to claim 1 in which the sense coil is adapted for connection to both the main and the start winding.

4. Apparatus according to claim 1 in which the bias resistor connected to the other main triac terminal is formed of a heater wire.

5. Apparatus according to claim 4 in which the heater wire is formed of nichrome.

6. Apparatus according to claim 1 further comprising a resistor connected in series with the triac gate terminal and the location intermediate the reed switch and the capacitor.

7. Apparatus according to claim 1 further comprising a capacitor connected between (1) a location intermediate the PTC resistor and the one main terminal, and (2) neutral.

* * * * *